United States Patent [19]

Norsworthy

[11] Patent Number: 5,035,630
[45] Date of Patent: Jul. 30, 1991

[54] POWER DISTRIBUTION SYSTEM

[75] Inventor: John A. Norsworthy, Gloucester, Canada

[73] Assignee: Unique-Quality Products, Inc., Alberta, Canada

[21] Appl. No.: 593,965

[22] Filed: Oct. 9, 1990

[30] Foreign Application Priority Data

May 28, 1990 [CA] Canada .................................. 2017673

[51] Int. Cl.⁵ .............................................. H01R 4/66
[52] U.S. Cl. ..................................... 439/92; 439/638; 174/6; 361/334
[58] Field of Search ....................... 361/334, 356, 332; 307/150, 11, 12; 174/6, 37; 439/92, 638, 639

[56] References Cited

U.S. PATENT DOCUMENTS

| | | | |
|---|---|---|---|
| 2,988,655 | 6/1961 | Rudolph et al. | 361/334 |
| 3,622,840 | 11/1971 | Kahn | 361/334 |
| 4,318,156 | 3/1982 | Gallagher | 361/334 |
| 4,390,926 | 6/1983 | Hart | 361/334 |

FOREIGN PATENT DOCUMENTS 1274034 11/1986 U.S.S.R. .................................. 174/6

Primary Examiner—Gary F. Paumen
Attorney, Agent, or Firm—Mason, Fenwick & Lawrence

[57] ABSTRACT

There is provided a new and useful power distribution box comprising a substantially closed casing having first and second interior compartments; at least one input opening, through a wall of the casing between the exterior of the casing and the interior of the first compartment; cover means on the casing moveable between a closed position and an open position for accessing the first compartment; first terminal means within the first compartment for receiving an electrical power cable inserted through the input opening; second terminal means within the first compartment; electrical conductor means between the first and second terminals; at least one electrical receptacle mounted through a side wall of the second compartment for receiving a connector of an external power load cable; electrical conductor means connecting the receptacle to the second terminal means; at least one electrically conducting grounding stake mounted on an exterior wall of the casing; and electrical conductor means joining at least one grounding stake to a grounding terminal of each receptacle.

20 Claims, 4 Drawing Sheets

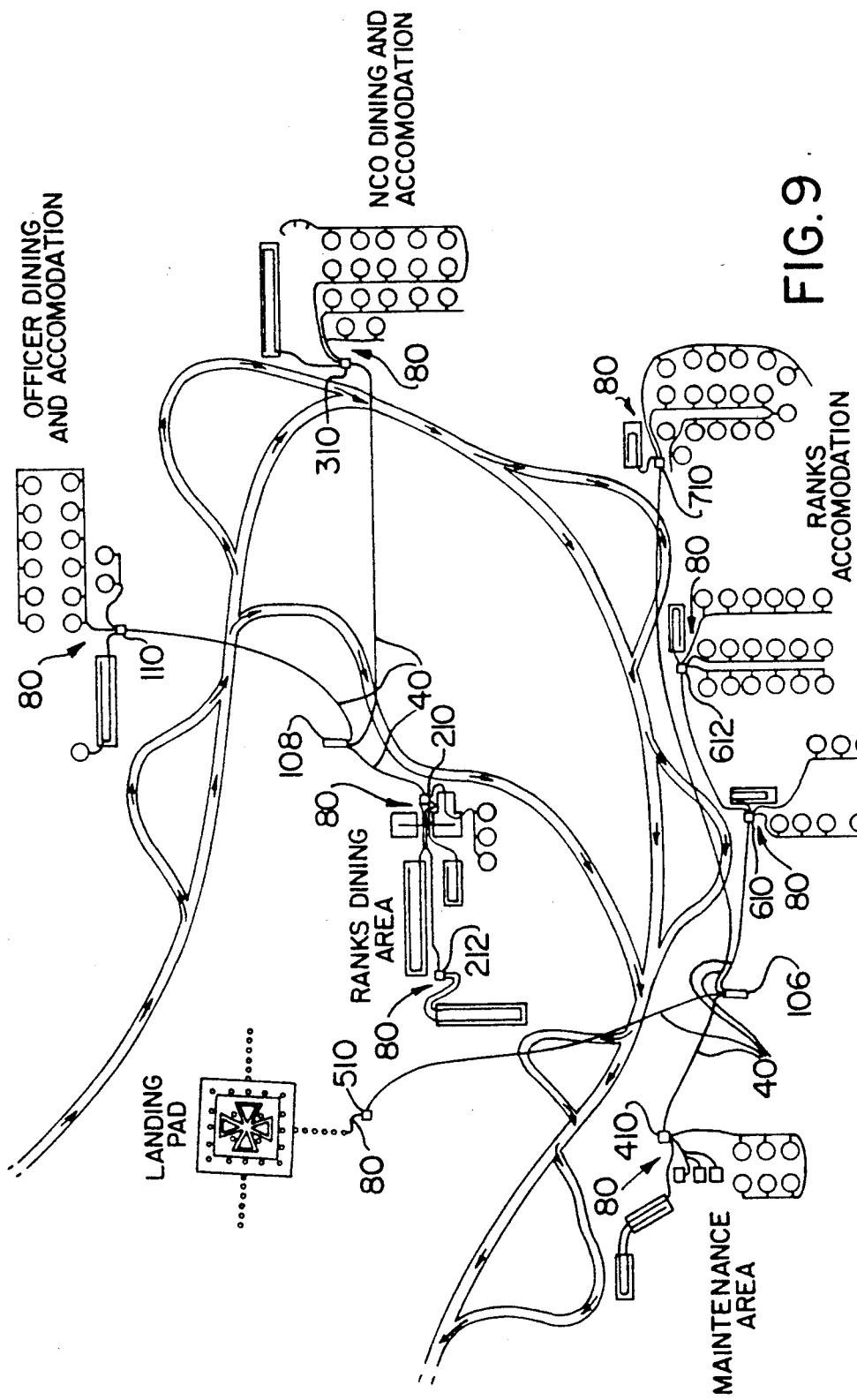

POWER DISTRIBUTION SYSTEM

This application relates to an electrical distribution box for use in a utility electrical distribution system.

BACKGROUND OF THE INVENTION

There exists a very substantial need for an electrical distribution system for use in areas where temporary distribution of electrical power is required. The need has been particularly acutely felt where larger outdoor systems are required. Typical examples are at construction sites, military bivouac areas, runways and helicopter landing pads.

It has been the case in the past that such systems, all of which are temporary in nature, were actually wired in the manner of permanent installations. There are disadvantages in this approach at both ends of a temporary use situation.

In planning such a set up, it is necessary to specify a very large number of individual items on a piece by piece basis. All of these components must then be wired up on site. The margin for error is clear in this situation, arising from improper connections, grounding problems and the involvement of less than highly skilled labour.

Furthermore, when certain of the components are not available when needed, or when necessary components are overlooked in specifying the installation, makeshift solutions are often proposed and utilized which are both inadequate for the required purpose and dangerous.

At the other end of the project, when the system is dismantled, many of the components will simply be discarded either because they are not properly designed for the outdoor use to which they have been put or simply because it is economically impractical to complete a dismantling job.

One specific aspect of such distribution systems has been the absence of a central distribution box which will provide for users a safe and convenient location from which to initiate or extend branches of the system. This must currently be done by skilled electricians tapping into existing lines.

Adequate grounding is always of great concern in temporary systems, particularly outdoor ones. Where a system is wired in the manner of a permanent system but with the knowledge that the system is not in fact intended to be permanent, less care will be taken in installing the system. There is thus a level of danger involved in relying on the integrity of a return ground line throughout such a system. Nonetheless, current systems rely on a three wire configuration.

Against this background a modular distribution system has been developed which substantially reduces the problems noted above. In particular, planning of a distribution system is greatly simplified, safety is improved and recoverability and reusability of the components is virtually assured.

A central feature of the system is the electrical distribution box which, again, renders straightforward and safe the central distribution of power, heretofore a major problem centre.

PRIOR ART

Applicant is not aware of any prior art which pertains to electrical distribution boxes for use in relatively large scale temporary distribution networks.

Hart U.S. Pat. No. 4,390,926, issued June 28, 1983, pertains to a switch box for controlling flow of current to lighting on motion picture sets.

Gallagher U.S. Pat. No. 4,318,156, issued Mar. 2, 1982, relates to an electrical power distribution box which is intended for small scale indoor use, such as in theatres or sound stages.

SUMMARY OF THE INVENTION

An electrical distribution box has now been developed which addresses a variety of problems heretofore encountered in establishing relatively large scale temporary electrical distribution systems, particularly where the system is primarily an outdoor one.

Accordingly, the invention provides a power distribution box comprising a substantially closed casing having first and second interior compartments; at least one input opening, through a wall of the casing between the exterior of the casing and the interior of the first compartment; cover means on the casing moveable between a closed position and an open position for accessing the first compartment; first terminal means within the first compartment for receiving an electrical power cable inserted through the input opening; second terminal means within the first compartment; electrical conductor means between the first and second terminals; at least one electrical receptacle mounted through a side wall of said second compartment for receiving a connector of an external power load cable; electrical conductor means connecting the receptacle to the second terminal means; at least one electrically conducting grounding stake mounted on an exterior wall of the casing; and electrical conductor means joining the grounding stake to a grounding terminal of each receptacle.

In a further embodiment there is provided a power distribution box comprising a substantially closed casing having first and second interior compartments; at least one input opening, through a wall of the casing between the exterior of the casing and the interior of the first compartment; cover means moveable between a closed position and an open position for accessing the first compartment; first terminal means within the first compartment for receiving an electrical power cable inserted through the input opening; second terminal means within the first compartment; electrical conductor means between the first and second terminals; at least one electrical receptacle mounted through a side wall of the second compartment for receiving a connector of an external power load cable; and electrical conductor means connecting the receptacle to the second terminal means; and wherein the cover means is hingedly connected to the casing, and the first terminal is mounted on the cover means.

GENERAL DESCRIPTION

The electrical distribution box of the present invention forms a central feature of an electrical distribution system for relatively large scale temporary installations. It is useful in describing the structure and advantages of the invention to describe it in the context of the distribution system as a whole. Accordingly, the following discussion includes the elements of a typical such system contemplated for use with the invention.

The main components of this typical electrical distribution system comprise feeder cables which connect an electrical power source to one or more system distribution boxes. The source may comprise power lines, if available, or a generator.

Apart from tapping feeding cables into power lines, the entire system requires a relatively low skill level for installation. It goes without saying that the tap should be installed by a highly qualified electrician.

From the distribution box a series of distribution lines run to various end use components. The end use components may comprise, for example, lighting strings for a series of tents, lighting for a helicopter landing pad, power for tools in a maintenance shop and an endless number of others.

The distribution lines for the system are provided in standard lengths with end connectors or plugs/receptacles. The connectors are preferably of the twist-lock type. The use of standard length sections provides an easy manner of ensuring that the available wiring meets the determined distance to be spanned.

When an area of end use is reached, the system provides a variety of splitters for tapping off of the distribution line. Again, the splitters are preferably provided with twist-lock connectors. Thus, for example, where it is desired to tap off power for lighting a line of tents, it is simply necessary to attach a two-way splitter to the end connector of the distribution line. One of the splits is then in turn connected to a twist-lock connector from the tent lighting line and the other can be connected by a twist-lock connector to a further section of distribution line.

In addition to the distribution lines and splitters, a variety of end use components are provided in a pre-wired condition and with twist-lock connectors for joining to the distribution line.

For example for a marquee type tent of a standard military configuration, light strings are provided having twist-lock connectors at the ends and having light sockets distributed at intervals to coincide with tent frame members. Similarly, for modular tents short lighting strings of perhaps four bulbs are provided such that the lighting sockets and the twist-lock connectors of the short strings are uniformly positioned in each module. When similar strings at the preceding and following module are joined, the positioning is then such as to provide substantially uniform lighting along the entire line of the module.

Similarly, standard receptacles and individual light fixtures may be provided as, for example, for providing power for appliances or for providing perimeter lights for a runway or landing pad.

It is felt that the problem of grounding is best dealt with on the basis of the postulate that the safest ground is a ground which is closest to the area of use. For that reason and for the reason that there is always a danger in relying on the integrity of a single ground wire throughout the system, the present invention utilizes two wire cables. This feature substantially reduces the expense of the system, as well. Grounding is thus achieved by mounting the distribution box directly onto a grounding stake or stakes which are connected electrically to the interior of the box.

Similarly, certain end use components such as receptacles and landing pad light units are also mounted directly on grounding stakes.

The entire system can thus be seen to be comprised of a very manageable number of components which can be readily configured from the distribution box to the end use.

All of the components are very sturdily constructed to withstand fairly rough handling and adverse weather conditions without damage. This factor, combined with the simple twist-lock connectors throughout the system, contribute to the reusability.

Turning to the distribution box itself, a weather tight substantially closed unit is provided. The box is preferably divided into two compartments, a first of which receives the feeder cable from the electrical power source and the second of which receives the twist-lock connectors from the distribution lines. An electrical conductor means joins the two compartments.

The top of the box preferably includes an overhang with drip strip over the connector areas for weather protection. A carrying handle is preferably located on the top of the box and the bottom of the box is preferably recessed to accommodate the handle of a lower box to facilitate stacking.

The second or distribution outlet side of the box is preferably not provided with interior access.

The first compartment or inlet side of the box is provided with removable cover means to facilitate connection of a source cable to the box. The cover means is preferably a hinged door.

Furthermore, in the most preferred configuration the hinged door actually carries the terminals for connection of the source cable. Thus, when the cover means is opened, the terminals swing out from the box to provide ready access to thus ensure that a good strong connection is made to the terminals.

It is highly preferred that the terminals be located on a shelf which is attached to the hinged cover, and that the conductor from the inlet compartment to the distribution compartment of the box be connected to terminals on the opposite side of the shelf. The terminals are thus preferably pins which extend through the shelf to directly connect the incoming cable to the inter-compartment conductor.

The hinged cover is preferably provided with key locking means to prevent tampering and ensure safe operation.

A series of receptacles for receiving the ends of the distribution lines are mounted through a wall of a casing in the second compartment. In the preferred case these comprise both simplex and duplex receptacles. The main distribution lines will be connected as required to the simplex receptacles by means of their twist-lock connectors.

The duplex receptacle will normally be included to facilitate the powering of appliances and tools in the area of the box.

As indicated above, the box is directly mounted onto at least one grounding stake. In the preferred case two such stakes are utilized. The stakes are preferably rotatably attached to a side of the box, so that they can be rotated to a non-protruding position for transport and then rotated to a protruding position for installation at a site.

In the preferred case the stakes are rotatably mounted on conducting pins which extend through the casing to the second compartment. The pins are preferably threaded and are conveniently attached through openings provided in the stakes by screw connectors such as wing nuts. The interior end of the pins is then connected by electrically conducting means to the ground terminals of the receptacles.

When the stakes are driven into the ground, there is then a direct ground from the box through the stakes.

Furthermore, in those cases where it may be impractical to ground the box through the stakes, the terminal pins and wing nuts can act as ground terminals through which to ground the box by external means.

The grounding stakes are of sufficient length to ensure good ground and are preferably marked to indicate the minimum earth penetration required for good ground.

An upper end of the stakes when in the deployed state preferably extends above the top of the box to facilitate pounding the stake.

Various materials may be used in the construction of the box. Hardwood is one preferred material.

BRIEF SUMMARY OF THE DRAWINGS

In drawings which illustrate embodiments of the invention,

FIG. 9 illustrates a typical military bivouac area utilizing an electrical distribution system run off a distribution box according to the invention.

Figure 1:
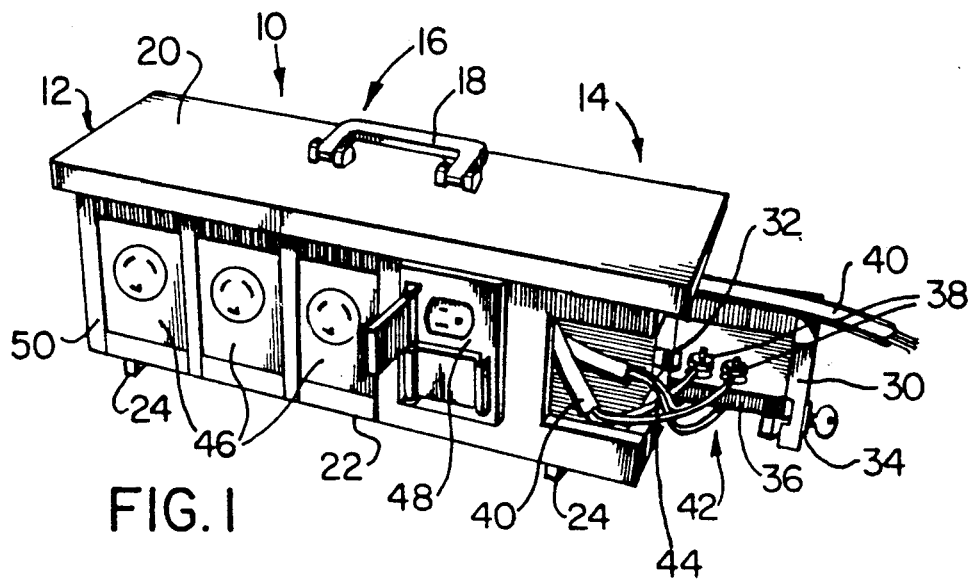
FIG. 1 is a front perspective of an electrical distribution box according to the invention.
Figure 2:
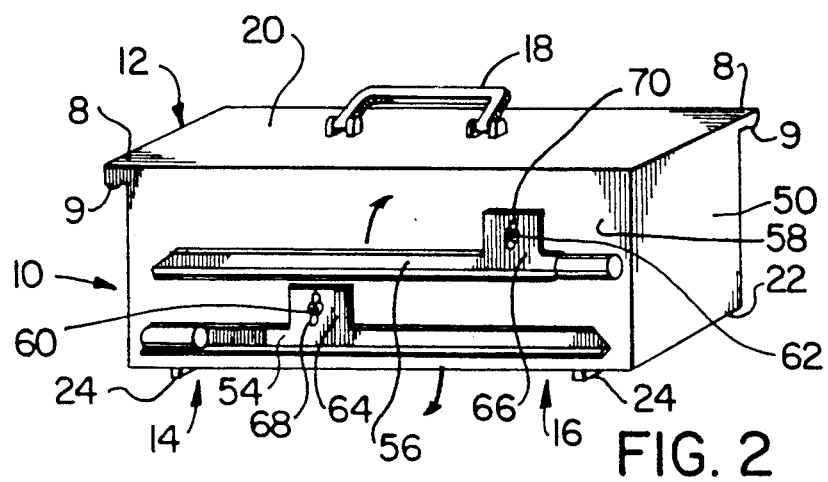
FIG. 2 is a rear perspective of a distribution box according to the invention with grounding stakes secured.
Figure 3:
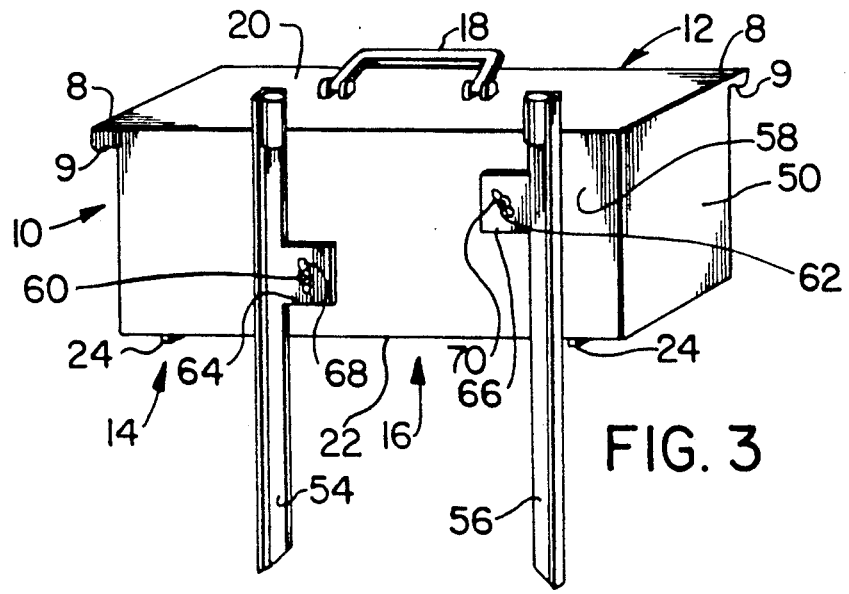
FIG. 3 is a rear perspective of a distribution box according to the invention with grounding stakes deployed.
Figure 4:
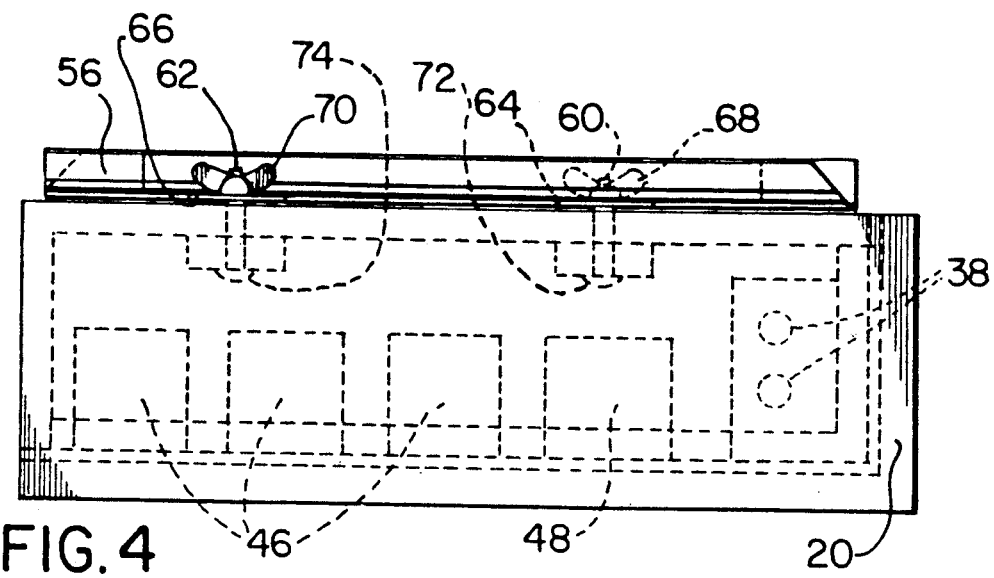
FIG. 4 is a top plan view of a distribution box according to the invention.
Figure 5:
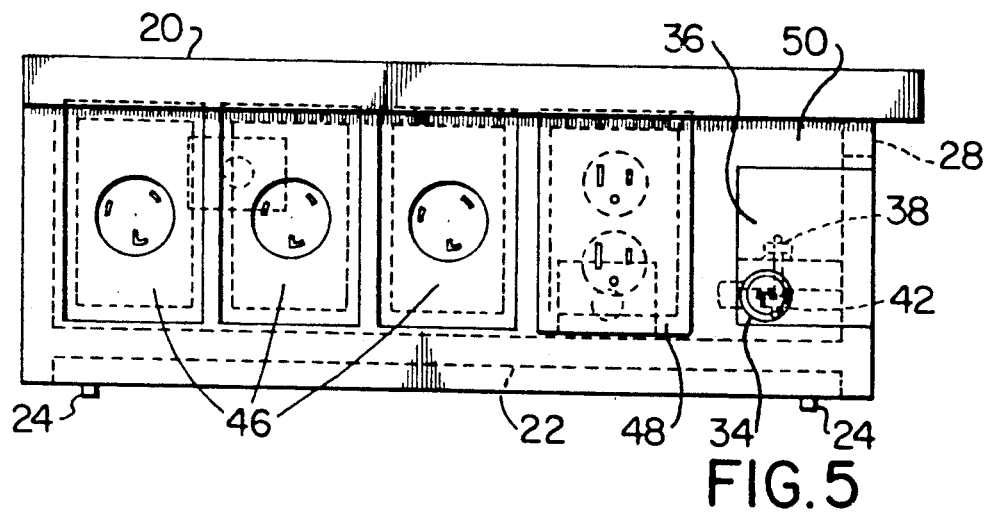
FIG. 5 is a front elevation of a distribution box according to the invention.
Figure 6:
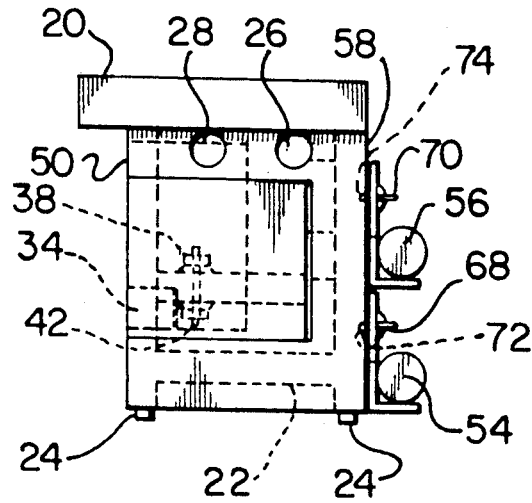
FIG. 6 is a side elevation of a distribution box according to the invention.
Figure 7:
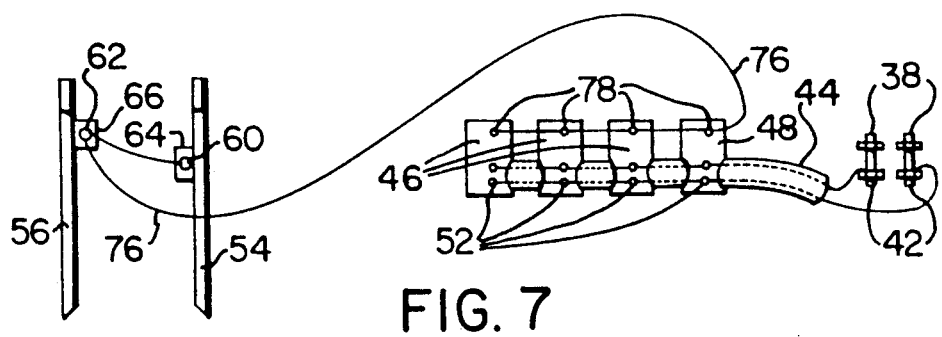
FIG. 7 illustrates typical wiring for a distribution box according to the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

With reference to the drawings the distribution box 10 according to the invention comprises a casing 12 which may be conveniently regarded as comprising an inlet side 14 and an outlet side 16.

The casing preferably includes a carrying handle 18 on the top 20 thereof and a recessed bottom 22. For convenience the box 10 preferably includes the feet 24. An overhang 8 and drip strip 9 are preferably provided over those sides of box 10 which include connections.

The inlet side of box 10 preferably includes a pair of feeder cable access holes 26 and 28. As well, inlet side 14 is provided with a cover means 30 which is movable between an open and a closed position. Preferably cover means 30 is connected to casing 12 by hinge 32. As well, cover means 30 is preferably lockable as by means of lock 34.

In the preferred case the cover means 30 is provided with a shelf 36 or similar structure upon which are mounted first or inlet terminal means 38. In use a feeder cable 40 is fed in through feeder cable access hole 26 and connected to terminals 38.

In the event that a second distribution box is required, an additional cable 39 (not shown) is connected to terminals 38 and fed out through access hole 28 and thence to an access hole of a second box 10 (not illustrated).

In the preferred case the shelf 36 includes on the opposite side thereof from inlet terminals 38 a second set of terminals 42 to which is connected a transfer cable 44 for transferring electrical power from the inlet side 14 to the outlet side 16 of casing 12.

In the preferred case and as illustrated, the inlet terminals 38 and the second set of terminals 42 comprise conducting pins which extend through shelf 36 to receive the respective ends of feeder cable 40 and transfer cable 44.

At least one and preferably a series of receptacles 46 and 48 are mounted through a wall 50 of casing 12. As illustrated, the receptacles 46 are of the singlex type and receptacle 48 of the duplex type, each receptacle 46, 48 having plural contacts.

The transfer cable 44 is connected to terminals 52 of receptacles 46 and 48.

At least one and preferably a pair of electrically conducting grounding stakes 54 and 56 are mounted on the outside of wall 58 of casing 12 and on the outlet side 16 thereof.

The stakes 54 and 56 are preferably rotatably mounted. The preferred manner of mounting is on a pair of conducting terminal pins 60 and 62 which extend through wall 58. Stakes 54 and 56 are preferably provided with a pair of mounting plates 64 and 66 respectively through which pins 60 and 62 pass. Plates 64 and 66 are rotatably secured on pins 60 and 62 by threaded connectors such as wing nuts 68 and 70.

The inner ends 72 and 74 of pins 60 and 62 respectively comprise terminals for a grounding cable 76. Grounding cable 76 is connected at its other end to grounding terminals 78 of receptacles 46 and 48.

When the stakes 54 and 56 are pounded into the earth, a direct ground path exists from the receptacles through the stakes to earth. In that regard it is preferred that the stakes 54 and 56 be inserted to a depth of at least six inches into the earth.

In the event that the box is located indoors or for other reasons it is impractical to utilize stakes 54 and 56, a grounding wire can be run from pins 60 and/or 62 to an available ground.

The feeder cable 40 is preferably 10/2 Cabtar cable with Type S insulation. The transfer cable 44 is preferably of the same construction but of a 14/2 rating.

FIG. 8 illustrates a series of typical components for use in the distribution system fed by box 10. Thus, FIG. 8a illustrates distribution cables 80 of a series of standard lengths. Each said cable includes respectively male and female twist-lock connectors 82 and 84. Clearly various lengths of the cables 80 can be combined to fit any particular situation.

Figure 8A:
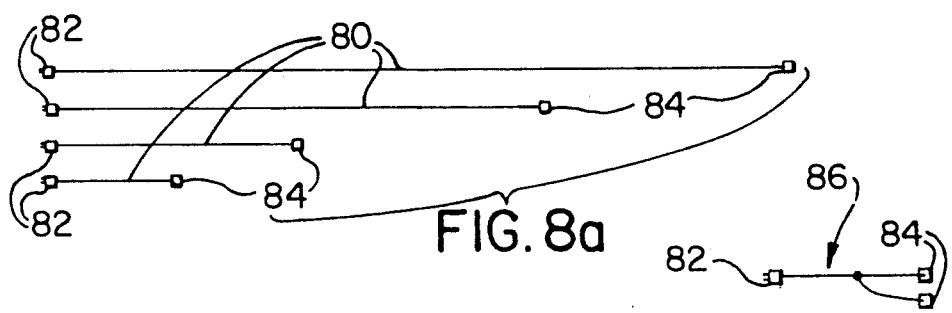
FIG. 8a to 8g illustrates typical components for a modular distribution system run off a distribution box according to the invention.
Figure 8B:
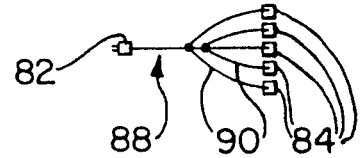

FIG. 8b illustrates two types of splitters which are useful for tapping into a distribution cable 80.

The splitter 86 is essentially a T or Y connector which enables a distribution cable 80 to be split into two or enables a single branch line to be tapped from cable 80. The splitter 86 includes a male connector 82 and a pair of female connectors 84 by which the splitter can be spliced into the cable 80 at any of the male/female connecting points.

The splitter 88 includes multiple branch feeders 90 to enable a series of branch lines to be tapped from distribution cable 80. Again, the splitter can obviously be inserted at any of the male/female joints in the distribution cable 80.

Figure 8C:
Figure 8D:
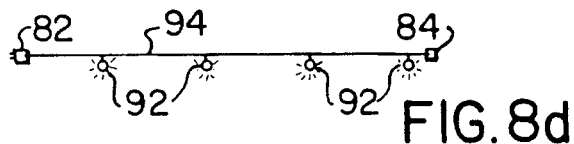

FIGS. 8c and 8d illustrate arrangements useful respectively for one standard size military marquee type tent and one standard size military modular type tent for lighting purposes. With respect to the marquee of FIG. 8c, the spacing of the bulbs may be chosen relative to standard table arrangements, as for use in a food preparation tent.

With respect to FIG. 8d, the modular tent arrangement can be chosen such that the bulbs 92 are properly spaced within each module.

In both cases the light strings 94 are provided with the standard male and female twist-lock connectors 82 and 84.

Figure 8E:
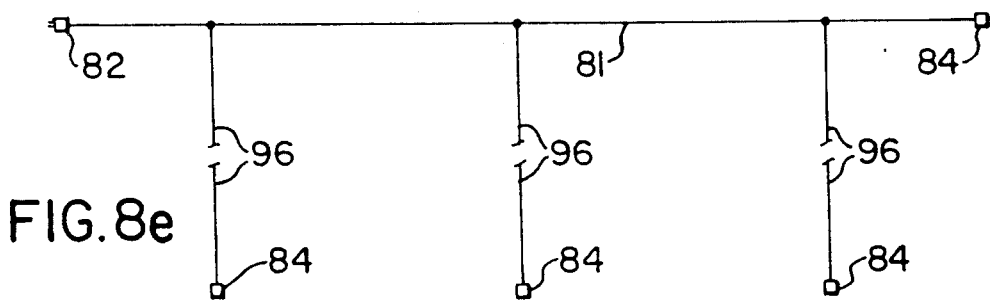

FIG. 8e illustrates a component for insertion into a distribution cable 80 and comprising a distribution cable section 81 and a series of branch lines 96. This spacing of branch lines 96 is chosen to accommodate the separation of one standard type tent, such that each of branches 96 will service a tent line.

Figure 8F:
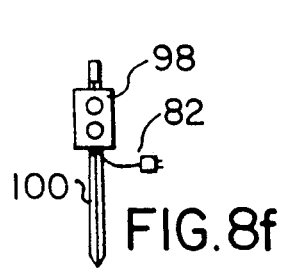

FIG. 8f illustrates a duplex receptacle 98 mounted on a grounding stake 100. The usual male connector 82 is provided for connecting receptacle 98 to the distribution system.

Figure 8G:
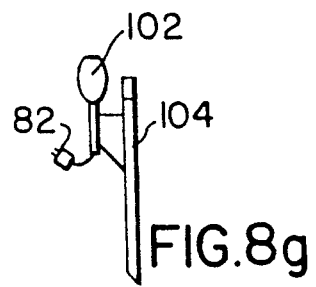

Finally, in respect of FIG. 8, FIG. 8g illustrates a marker light 102 mounted on a grounding stake 104 and including a male connector 82 for connection to the distribution system. A series of lights 102 may be established to mark the perimeter of a landing pad or may be used for many other purposes.

FIG. 9 illustrates a typical military bivouac area which for purposes of illustration utilizes portable generators to provide for electrical needs.

Thus, generators 106 and 108 provide power by way of a series of feeder cables 40 to distribution boxes 110, 210, 310, 410, 510, 610 and 710. In turn distribution box 610 feeds distribution box 612 and distribution box 210 feeds distribution box 212. Various distribution cables 80 then feed various end uses as discussed above and as generally set out on the figure.

A reasonably competent planner would be able to estimate the requirement for two eighteen kilowatt generators, nine distribution boxes and approximately thirteen thousand feet of distribution and end use cabling.

While it would be economically feasible to provide various customized features for use in distribution systems utilizing the distribution box according to the invention, it is in fact the case that most needs can be met through a relatively small number of standard components as described. It will be evident that in this context the term components is intended to include the wiring as well as the end use devices.

Thus it is apparent that there has been provided in accordance with the invention a power distribution box that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A power distribution box comprising:
 a substantially closed casing having first and second interior compartments;
 at least one input opening, through a wall of said casing between the exterior of said casing and the interior of said first compartment;
 cover means on said casing moveable between a closed position and an open position for accessing said first compartment;
 first terminal means within said first compartment for receiving an electrical power cable inserted through said input opening;
 second terminal means within said first compartment;
 electrical conductor means between said first and second terminals;
 at least one electrical receptacle having plural contacts and mounted through a side wall of said second compartment for receiving a connector of an external power load cable;
 electrical conductor means connecting said receptacle to said second terminal means;
 at least one electrically conducting grounding stake mounted on an exterior wall of said casing; and
 electrical conductor means joining at least one said grounding stake to a grounding terminal of each said receptacle.

2. The distribution box of claim 1 wherein each said stake is rotatable between a first position in which said stake does not protrude beyond the outer edges of said wall upon which it is mounted, and a second position in which at least a bottom section of said stake protrudes beyond a bottom edge of said wall on which it is mounted.

3. The distribution box of claim 2 wherein in said second position top and bottom sections of each said stake protrude beyond respective top and bottom edges of said casing.

4. The distribution box of claim 1 wherein at least one said stake includes external electrical terminal means thereon in electrical contact with said stake.

5. The distribution box of claim 4 wherein said at least one stake is mounted on an electrically conducting threaded pin protruding through said casing and wherein said pin and an associated internally threaded retainer comprise said external terminal means.

6. The distribution box of claim 5 wherein said pin is a bolt and said retainer is a wing nut.

7. The distribution box of claim 5 wherein said pin protrudes within said casing and wherein said conducting means joining said stake to said grounding terminals comprises said pin and electrical conductor means joining said pin to said grounding terminals.

8. The distribution box of claim 2 wherein said bottom section of each said stake is at least six inches in length.

9. The distribution box of claim 2 including two said stakes.

10. The distribution box of claim 1 including at least two simplex said receptacles and at least one duplex said receptacle.

11. The distribution box of claim 1 wherein said cover means is hingedly connected to said casing, and said first terminal is mounted on an interior side of said cover means.

12. The distribution box of claim 11 wherein said cover means includes a shelf on said interior side, said shelf having first and second sides, and wherein said first terminal is mounted on said first side of said shelf.

13. The distribution box of claim 12 wherein said second terminal is mounted on said second side of said shelf.

14. The distribution box of claim 13 wherein said first and second terminals and said conductor means between said first and second terminals comprise a pin extending through said shelf and protruding from said first and second sides thereof.

15. The distribution box of claim 1 wherein said cover is lockable.

16. A power distribution box comprising:
    a substantially closed casing having first and second interior compartments;
    at least one input opening, through a wall of said casing between the exterior of said casing and the interior of said first compartment;
    cover means moveable between a closed position and an open position for accessing said first compartment;
    first terminal means within said first compartment for receiving an electrical power cable inserted through said input opening;
    second terminal means within said first compartment;
    at least one electrical receptacle having plural contacts and mounted through a side wall of said second compartment for receiving a connector of an external power load cable; and
    electrical conductor means connecting said receptacle to said second terminal means;
    and wherein said cover means is hingedly connected to said casing, and said first terminal is mounted on said cover means.

17. The distribution box of claim 16 wherein said cover means includes a shelf on said interior side, said shelf having first and second sides, and wherein said first terminal is mounted on said first side of said shelf.

18. The distribution box of claim 17 wherein said second terminal is mounted on said second side of said shelf.

19. The distribution box of claim 18 wherein said first and second terminals and conductor means between said first and second terminals comprise a pin extending through said shelf and protruding from said first and second sides thereof.

20. The distribution box of claim 16 wherein said cover is lockable.

* * * * *